US011760127B2

(12) United States Patent
Abdellatif et al.

(10) Patent No.: US 11,760,127 B2
(45) Date of Patent: Sep. 19, 2023

(54) TWO-WHEEL COMPACT INSPECTION CRAWLER WITH AUTOMATIC PROBE NORMALIZATION

(71) Applicants: Saudi Arabian Oil Company, Dhahran (SA); KING ABDULLAH UNIVERSITY OF SCIENCE AND TECHNOLOGY, Thuwal (SA)

(72) Inventors: Fadl Abdellatif, Thuwal (SA); Abdoulelah Al-Hannabi, Thuwal (SA); Sahejad Patel, Thuwal (SA); Mohamed Abdelkader, Thuwal (SA); Jeff S. Shamma, Thuwal (SA)

(73) Assignees: SAUDI ARABIAN OIL COMPANY, Dhahran (SA); King Abdullah University Of Science And Technology, Thuwal (SA)

(*) Notice: Subject to any disclaimer, the term of this patent is extended or adjusted under 35 U.S.C. 154(b) by 300 days.

(21) Appl. No.: 17/111,320

(22) Filed: Dec. 3, 2020

(65) Prior Publication Data
US 2022/0176736 A1 Jun. 9, 2022

(51) Int. Cl.
*B60B 19/00* (2006.01)
*B62D 57/024* (2006.01)
(Continued)

(52) U.S. Cl.
CPC ............ *B60B 19/006* (2013.01); *B25J 5/007* (2013.01); *B62D 57/024* (2013.01); *G01N 29/225* (2013.01)

(58) Field of Classification Search
CPC ...... B60B 19/006; B25J 5/007; B62D 57/024; G01N 29/2493; F16L 2101/30
See application file for complete search history.

(56) References Cited

U.S. PATENT DOCUMENTS 5,610,488 A 3/1997 Miyazawa
5,809,099 A 9/1998 Kim et al.
(Continued)

FOREIGN PATENT DOCUMENTS

CN 2108007 U 6/1992
CN 202624434 U 12/2012
(Continued)

OTHER PUBLICATIONS

International Search Report and Written Opinion in corresponding PCT Application No. PCT/US2021/061829 dated Mar. 16, 2022.
(Continued)

*Primary Examiner* — Frank B Vanaman
(74) *Attorney, Agent, or Firm* — Leason Ellis LLP (57) ABSTRACT

A two-wheel compact magnetic crawler vehicle for traversing and inspecting surfaces. The crawler comprises a chassis. Two independently actuated magnetic drive wheels are spaced apart in a lateral direction and mounted to the chassis by a hinged joint enabling each wheel to tilt in response to the surface curvature. A probe wheel is provided at the midpoint between the two drive wheels and laterally in line therewith. A spring-assisted probe carrier passively moves the probe wheel vertically relative to the chassis in response to changes in the surface curvature. Additionally, the vehicle includes a probe angle normalization mechanism comprising spring-loaded, vertically moveable, ball casters positioned symmetrically about the probe wheel. The combined utilization of the probe carrier and the caster carrier passively maintain the probe contacting the surface, the chassis level, and the probe normal to the surface irrespective of changes in the surface curvature with vehicle movement.

10 Claims, 11 Drawing Sheets

(51) Int. Cl.
*B25J 5/00* (2006.01)
*G01N 29/22* (2006.01)

(56) References Cited

U.S. PATENT DOCUMENTS

| | | | | |
|---|---|---|---|---|
| 6,125,955 | A * | 10/2000 | Zoretich | B60B 19/006 |
| | | | | 180/7.1 |
| 8,604,900 | B2 | 12/2013 | Kocijan | |
| 10,343,276 | B2 | 7/2019 | Zanini et al. | |
| 2006/0243499 | A1* | 11/2006 | Hosoda | B62D 57/028 |
| | | | | 180/8.5 |
| 2012/0273284 | A1* | 11/2012 | Nesnas | B62D 21/04 |
| | | | | 180/218 |
| 2014/0013872 | A1* | 1/2014 | Thursby | F16L 55/28 |
| | | | | 73/865.8 |
| 2014/0197829 | A1 | 7/2014 | Szielasko et al. | |
| 2014/0345957 | A1 | 11/2014 | Bernstein et al. | |
| 2015/0153312 | A1 | 6/2015 | Gonzalez et al. | |
| 2016/0238565 | A1 | 8/2016 | Gonzalez et al. | |
| 2016/0311476 | A1* | 10/2016 | Outa | B62D 63/04 |
| 2017/0348850 | A1 | 12/2017 | Nguyen | |
| 2017/0355225 | A1 | 12/2017 | Lee | |
| 2018/0232874 | A1 | 8/2018 | Ostervold et al. | |
| 2019/0017656 | A1 | 1/2019 | Zanini et al. | |
| 2019/0152544 | A1* | 5/2019 | Outa | B63B 59/10 |
| 2020/0172184 | A1 | 6/2020 | Abdellatif et al. | |

FOREIGN PATENT DOCUMENTS

| | | |
|---|---|---|
| CN | 104787144 A | 7/2015 |
| CN | 107600214 A | 1/2018 |
| CN | 110077483 A | 8/2019 |
| EP | 0346473 A1 | 12/1989 |
| EP | 2045600 A1 | 4/2009 |
| GB | 23491 A | 9/1903 |
| JP | S63149557 A | 6/1988 |
| JP | H0989855 A | 4/1997 |
| JP | 2007130710 A | 5/2007 |
| KR | 101002434 B1 | 12/2010 |
| SL | 9700050 A | 10/1998 |
| WO | 2011017668 A2 | 2/2011 |

OTHER PUBLICATIONS

No Author. "ThetaScan: A Manual Ultrasonic C-Scan Imaging System." SilverWing. No Date. 1 page.

Hernando Leon-Rodriguez et al: "A compact wall-climbing and surface adaptation robot for non-destructive testing" Control, Automation and Systems (ICCAS), 2012 12th International Conference On, IEEE.

Saiigdeok Park et al: "Design of a mobile robot system for automatic integrity evaluation of large size reservoirs and pipelines in industrial fields" Proceedings of the 2003 IEEE Internaional Conference on Intelligent Robots and Systems.

* cited by examiner

TWO-WHEEL COMPACT INSPECTION CRAWLER WITH AUTOMATIC PROBE NORMALIZATION

FIELD OF THE DISCLOSURE

The present invention relates to robotic vehicles and, in particular, robotic inspection vehicles having magnetic drive wheels and an inspection probe for inspecting a surface traversed by the vehicle.

BACKGROUND OF THE DISCLOSURE

Routine inspection of equipment is critical in most industries in order to ensure safety and optimize performance. For example, in the petroleum industry and related fields, liquids and gases and mixtures thereof are transported via pipelines and these materials are also stored in large tanks.

It is known in this industry that in order to maintain the integrity of pipelines, storage tanks and the like, a sensor device can be employed to inspect such surfaces. In particular, an inspection vehicle can be used to travel across a surface of the target object (e.g., a pipe or tank) and record information about the quality of the pipe wall. A majority of these inspection vehicles use ultrasonic or magnetic sensors to carry out the inspection. Based on the recorded information, any cracks or other deficiencies in the surface being inspected (e.g., pipe wall) can be detected and noted to allow for subsequent remedial action to be taken.

In the past, there have been different inspection vehicle designs that are used to inspect various structures, such as factory equipment, ships, underwater platforms, pipelines and storage tanks. If a suitable inspection vehicle is not available to inspect the structure, an alternative is to build scaffolding that will allow people access to inspect these structures, but at great cost and danger to the physical safety of the inspectors. Past inspection vehicles have lacked the control, maneuverability and compact packaging (i.e., size) necessary to inspect such surfaces effectively.

In addition, the use of directional sensors such as ultrasonic dry coupled wheel probes is common during inspection activities in the oil and gas industry. Directional sensors are preferably held or maintained a preferred angle relative to the surface being inspected, for instance, perpendicular to the surface. While there are a number of different sensors that can be used in such inspection vehicles, one preferred type of ultrasonic sensor is a dry coupled probe (DCP) that is configured to perform ultrasonic thickness (UT) inspection of the surface to measure wall thickness and detect corrosion. Dry coupled probes are typically built in the form of a wheel in which a shaft (axle) is meant to be held fixed since the shaft has the transducer component rigidly embedded in it while an outer tire rotates around the shaft. The shaft of the probe thus is preferably held and positioned such that the transducer always points at the surface, meaning that the wheel is not titled in its roll and pitch directions.

It is with respect to these and other considerations that the disclosure made herein is presented.

SUMMARY OF THE DISCLOSURE

According to an aspect of the present invention, a two-wheel compact inspection crawler vehicle for traversing a surface is disclosed. The vehicle comprises a chassis and two magnetic drive wheels. Each drive is mounted to the chassis by a respective hinge joint configured to allow a respective drive wheel to move with respect to the chassis along a first path in at least a vertical direction in response to a curvature of the surface. Furthermore, the drive wheels are spaced apart in a lateral direction and are configured to be driven independently. Additionally, a longitudinal axis of the chassis extends perpendicularly to the lateral direction and vertical direction and through a midpoint between the two drive wheels.

The vehicle further comprises a probe carrier mounted to be moveable relative to the chassis in at least the vertical direction in response to the curvature of the surface. Also included is a sensor probe provided at the midpoint between the two drive wheels and generally in line with the two drive wheels in the lateral direction. In particular, the sensor probe is mounted to the probe carrier such that it is moveable relative to the chassis in at least the vertical direction in response to the curvature of the surface.

The vehicle further comprises a plurality of caster carriers, each caster carrier being mounted to be moveable relative to the chassis in at least the vertical direction. Additionally, a plurality of ball casters configured to contact and move along the surface during normal operation of the vehicle are arranged about the sensor probe such that the probe is centrally positioned between the plurality of ball casters. Furthermore, each ball caster is mounted to a respective caster carrier among the plurality of caster carriers such that the ball casters are moveable relative to the chassis in at least the vertical direction in response to the curvature of the surface.

These and other aspects, features, and advantages can be appreciated from the accompanying description of certain embodiments of the invention and the accompanying drawing figures and claims.

DESCRIPTION OF CERTAIN EMBODIMENTS OF THE DISCLOSURE

By way of overview and introduction, a two-wheeled compact inspection crawler vehicle having an automatic probe normalization mechanism is disclosed. The vehicle (also referred to as the crawler) is configured to be capable of traversing ferromagnetic surfaces of almost any curvature with high dexterity and maneuverability regardless of surface geometry and orientation and to perform inspection of the traversed surface using inspection sensors.

Ultrasonic Testing (UT) is a commonly used non-destructive testing technique for inspection of steel surfaces. It can be used to periodically measure the thickness of steel to ensure does not fall below a certain critical limit to avoid leaks, failures and unplanned shutdowns. Curved surfaces, such as pipes, constitute a challenge for the UT signal transmitted through the inspected wall as the sensor is directional and needs to stay normal to the surface and a slight inclination would cause the loss of the signal on the way back to the sensor, necessitating the need for continuous calibration of the probe position for different curvatures.

One type of UT probe, commonly referred to as Dry-Coupled Probes (DCP), do not require any gel or liquid couplant to acquire the thickness measurement. They are constructed embedding an ultrasonic transducer in a fixed non-rotating shaft that is wrapped by a rubber wheel which rotates about the fixed shaft. One of the challenges of using a DCP is that it needs to always be perpendicular (normal) to the steel curved surface while taking the measurement as it uses the same principle of sending and receiving ultrasonic signals as traditional ultrasonic probes. The shaft of the probe thus is preferably held and positioned such that the transducer always points at the surface, meaning that the wheel is not titled in its roll and pitch directions.

In practice, different surface curvatures necessitate the rotational adjustment of the DCP wheel's shaft to make sure transducers therein are pointing directly towards the surface to be inspected to ensure proper measurement. This process of calibrating the probe angle is referred to as normalization. Normalizing the probe is typically a manual process. For example, when inspecting pipes, normalization has to be performed for every different pipe diameter. Moreover, inspecting a pipe circumferentially imposes a certain curvature but inspecting longitudinally is effectively equivalent to inspecting a flat surface. Therefore, the transition between both cannot be done seamlessly and manual normalization has to be done before completing the transition.

Thus, one of the challenges in using a DCP is that the probe should be maintained perpendicular (normal) to the surface being inspected and this can be a challenge while the inspection vehicle is mobile and navigating the surface. A further challenge is to maintain the probe in close proximity or in contact with the surface being inspected. This is especially difficult since the inspection vehicle can drive circumferentially, longitudinally and helically on a pipe or tank surface, which means that the DCP has to be realigned to ensure that the DCP is normal to the surface being inspected regardless of the location of the inspection vehicle.

The disclosed embodiments provide a solution for providing vehicular movement in non-gravity-dependent operations, where the impact of gravity on vehicle movement can be minimized while still enabling versatile control and maneuverability. As well, the disclosed embodiments are also directed to a mechanism (device/apparatus) that stabilizes, maintains an appropriate height of the sensor and normalizes the sensor (e.g., a DCP) relative to the surface being inspected when inspection is being performed and while the inspection vehicle is being steered and/or moved in a variety of different tracks along the surface and despite a varying range of degrees of curvature of the surface.

Figure 1A:
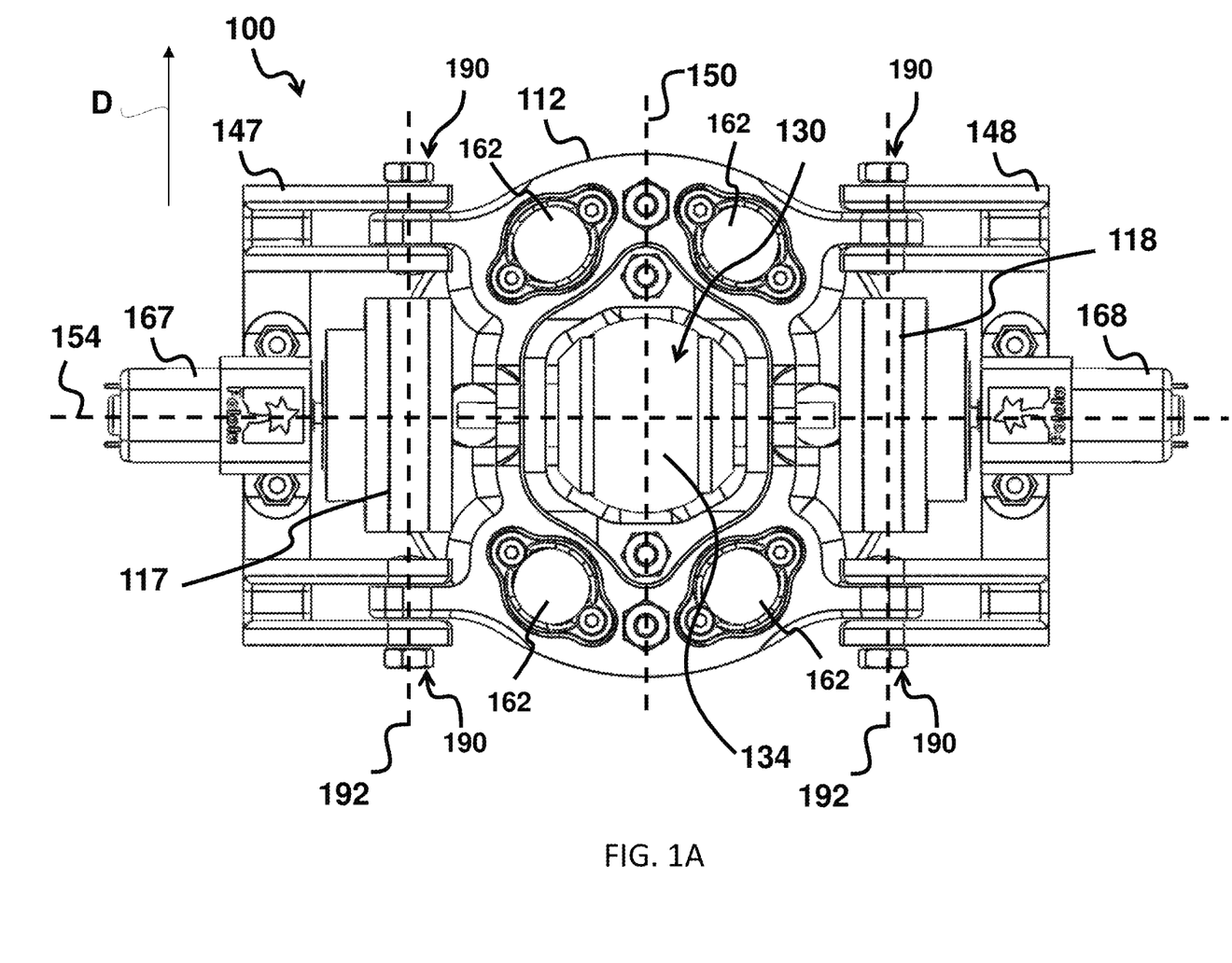
FIG. 1A is a bottom-view diagram of a two-wheel compact inspection crawler vehicle in accordance with one or more disclosed embodiments.
Figure 1B:
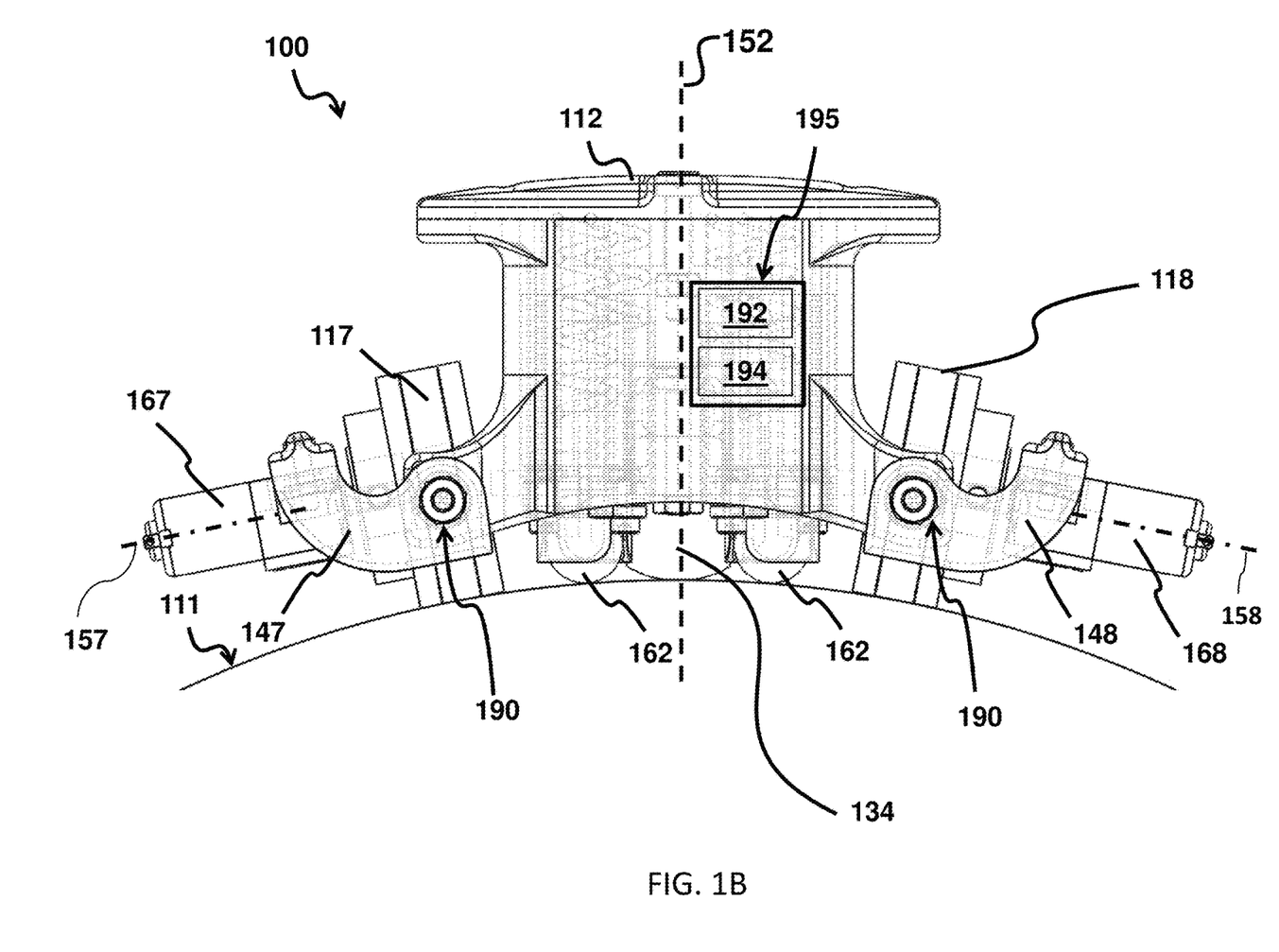
FIG. 1B is a front-view diagram of the two-wheel compact inspection crawler vehicle in accordance with one or more disclosed embodiments.
Figure 1C:
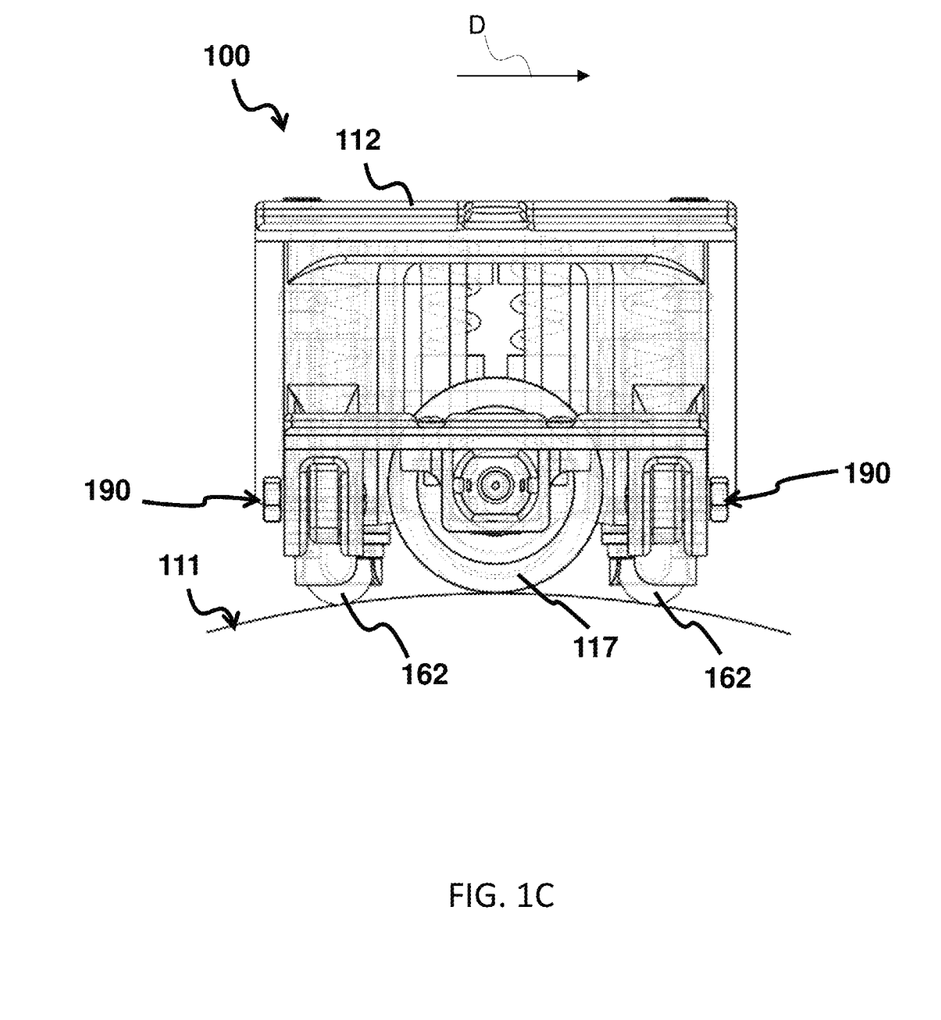
FIG. 1C is a side-view diagram of the two-wheel compact inspection crawler vehicle in accordance with one or more disclosed embodiments.

Referring to FIG. 1A-1C, an exemplary robotic crawler vehicle 100 in accordance with an embodiment of the disclosure is shown. FIG. 1A provides a bottom view of the vehicle 100. FIG. 1B provides a front view of the vehicle 100 traversing longitudinally along a curved surface 111, which is for example and without limitation the outer surface of a pipe. FIG. 1C provides a side view of the vehicle 100 traversing circumferentially about the pipe's outer surface 111. FIGS. 3A-3E similarly illustrate the vehicle 100 on a variety of curved surfaces.

As further described herein, the disclosed crawler 100 is designed to ensure the perpendicularity of a directional sensor as the crawler inspects the target surface. In this exemplary embodiment, the crawler 100 is fitted with a dry coupled wheel probe 130 (DCP) for Ultrasonic Thickness (UT) inspection.

Specifically, the crawler 100 is designed to provide passive normalization of the DCP 130 by providing the DCP wheel 134 at the center of four spring loaded ball casters 162 and in-line with two magnetic wheels 117, 118 that are hingedly mounted to the chassis by respective hinged flaps 147, 148. This mechanical system passively deploys and orients the DCP to take valid ultrasonic thickness measurements on flat or curved surfaces, both concave and convex surfaces, and irrespective of the particular path of travel (e.g., longitudinally, circumferentially, helically and the like).

In an exemplary embodiment, the probe can be mounted to the chassis having a have a fixed orientation relative to the vehicle's chassis and probe normalization involves adjusting the attitude of the chassis relative to the surface. The foregoing aspects of the crawler, as further described herein, address multiple major challenges that are common in the development of inspection crawlers while simultaneously reducing the overall size and weight of the inspection vehicle.

As shown, the vehicle 100 can be in the form of a two-wheeled magnetic crawler inspection vehicle that can be controllably driven across the surface 111. For example, the vehicle 100 can be a robotic device for inspection of one or more regions of the surface 111 wherein the vehicle can be controlled by a user who can transmit commands to the vehicle to control the operation of the vehicle. In this manner, the user can effectively drive the vehicle across the surface and can stop and steer the vehicle as well. The vehicle can also be configured to drive autonomously as well.

The robotic vehicle 100 includes a first chassis section 112. Two magnetic drive wheels 117 and 118 are supported by the first chassis section. Specifically, the two magnetic drive wheels 117 and 118 are pivotably coupled to the first chassis section 112 by respective flaps 147 and 148 that hold the drive wheels. The flaps are joined to the first chassis section by respective hinge joints 190.

More specifically, the two drive wheels 117 and 118 and the DCP probe's wheel 134 are located along the lateral axis 154. Additionally, the DCP probe is provided along the longitudinal axis 150 of the crawler, in other words, at the midpoint between the two drive wheels.

The hinge connection 190 between the flaps 147, 148 and the chassis 112 enable the drive wheels 117 and 118 to pivot about respective hinge axes 192. The two drive wheels are preferably magnetic to enable the crawler to stick to the pipe surface and drive even in the most challenging orientations such as driving upside down on the 6 o'clock position outside of a pipe or on the 12 o'clock position inside a pipe. To allow such maneuverability, the attraction force from the magnetic wheels must be higher than the repelling force from the weight of the crawler and other elements pushing against the surface (e.g., the spring-loaded probe, ball casters and the like). The magnetic drive wheels should also provide enough grip for the wheels not to spin in place while driving.

According to a salient aspect, the magnetic force provided by the wheels is maximized by hingedly mounting the wheels to the chassis with respective hinge flaps. The hinged mounting allows the magnetic wheels to independently tilt as a function of the curvature of the surface, so as to keep the vertical axis of the wheel perpendicular to the surface and thus keep the wheel flat against the surface maximizing the area of contact between the wheel and the ferrous surface and magnetic force.

In some embodiments, the hinge connection 190 is an embedded revolute hinge having one degree of freedom, which allows the magnetic wheel to have full contact once deployed, even on different surface curvatures. The degree of freedom provided by the joint is important to facilitate adhesion and maneuverability in the event of changing driving direction along longitudinal, circumferential or helical paths.

Figure 3A:
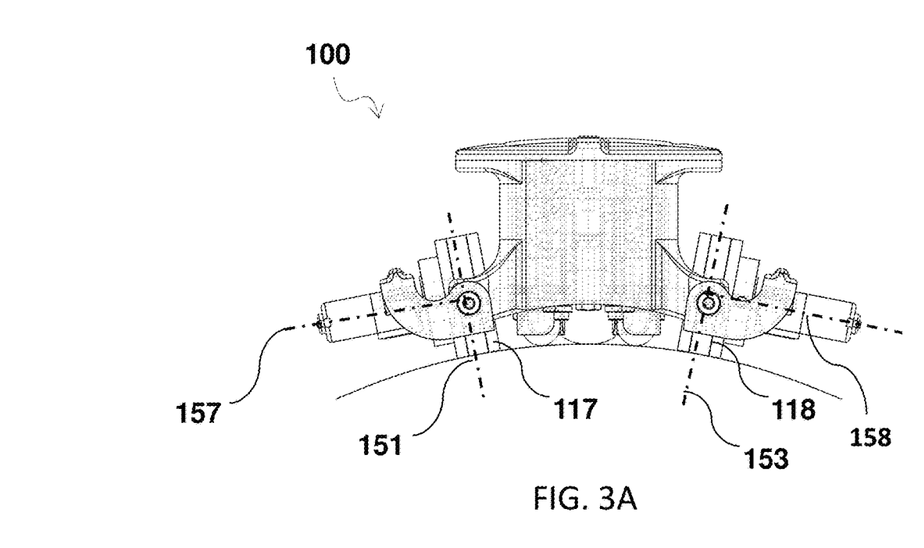
FIG. 3A is a front-view diagram of a two-wheel compact inspection crawler vehicle of FIGS. 1A-1C on a convex curved surface in accordance with one or more disclosed embodiments.
Figure 3B:
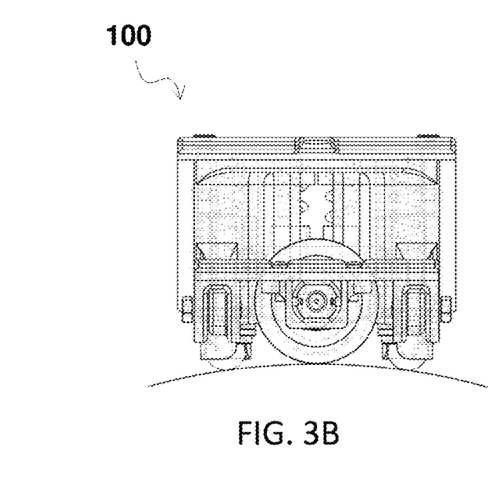
FIG. 3B is a side-view diagram of the two-wheel compact inspection crawler vehicle on a convex curved surface in accordance with one or more disclosed embodiments.
Figure 3C:
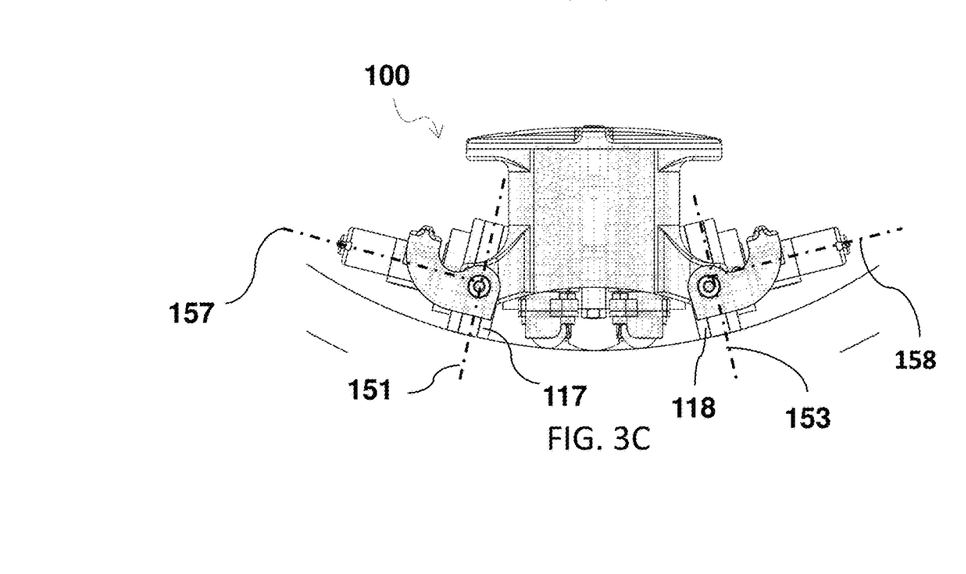
FIG. 3C is a front-view diagram of the two-wheel compact inspection crawler vehicle on a concave curved surface in accordance with one or more disclosed embodiments.
Figure 3D:
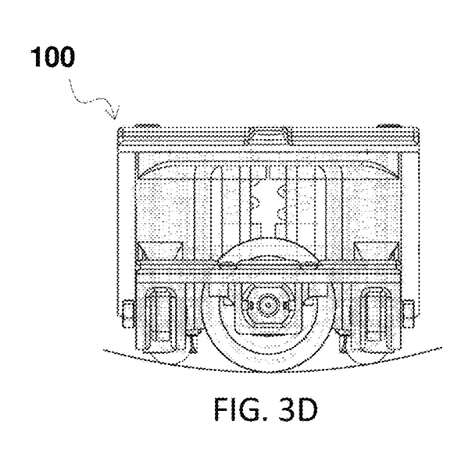
FIG. 3D is a side-view diagram of the two-wheel compact inspection crawler vehicle on a concave curved surface in accordance with one or more disclosed embodiments.
Figure 3E:
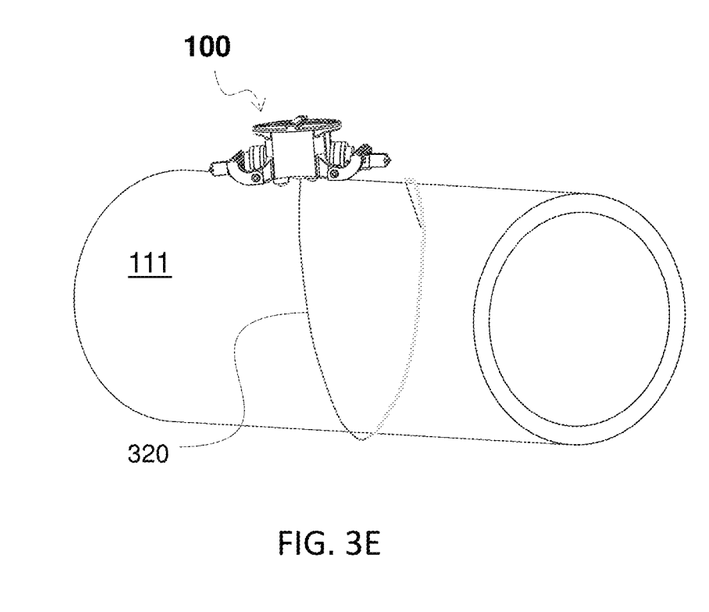
FIG. 3E is a perspective-view diagram of the two-wheel compact inspection crawler vehicle of traversing helically about the outer surface of a pipe in accordance with one or more disclosed embodiments.

FIGS. 3A-3E further illustrate the passively adapting motion of the magnetic wheels 117 and 118 (in addition to showing the height-adjusting probe wheel 134 and casters 162) in response to the curvature of the traversed surface. In particular, FIGS. 3A and 3B respectively show a front and side view of the vehicle 100 on a convex surface. FIGS. 3C and 3D respectively show a front and side view of the vehicle on a concave surface. FIG. 3E is a perspective view showing the vehicle 100 traversing a pipe in a helical path 320. FIGS. 3A-3D illustrate the angular adjustment of the wheels 117 and 118, their respective rotational axes 157 and 158 and vertical axes 151 and 153, in response to various surface curvatures and angles. FIGS. 3A-3E demonstrate how mounting each wheel with a hinge joint enables the crawler 100 to traverse a pipe along longitudinal, circumferential or helical paths on both concave surfaces (FIGS. 3C-3D) and convex surfaces (FIGS. 3A-3B).

In the robotic vehicle's forward direction of travel, which is indicated by arrow "D," the drive wheels 117 and 118 of the robotic vehicle rotate about respective axis 157 and 158 respectively in either direction in response to a motor that propels the vehicle forward and backwards. The axis of rotation of the drive wheels, when on a flat surface can also be parallel to the lateral axis 154, which runs widthwise through the first chassis section 112. Perpendicular to the lateral axis and rotational axes of the wheels and extending lengthwise through the middle of the first chassis section (e.g., parallel to a flat surface that the crawler is on and bisecting the vehicle into left and right sides/halves) is the longitudinal axis 150. Also shown in FIG. 1B is the perpendicular axis 152, which extends perpendicularly to both the longitudinal axis and the lateral axis and is normal to the surface 111 (when the crawler is resting on a flat surface).

It can also be appreciated that each drive wheel can be independently actuated and configured to propel the vehicle in the forward and rearward direction as well as steer the vehicle, as further described herein. The spaced apart drive wheels provide stability to the vehicle 100. In addition, the drive wheels can include a strong magnet which creates a pull force between the wheels and a ferromagnetic surface 111 on which the vehicle can be moved, and this structural arrangement assists in resisting tipping of the vehicle.

Although not shown in its entirety in the figures, the vehicle can include a control module. The control module can include one or more motors 167 and 168 and drive assembly for transferring mechanical power from the motors to the drive wheels 117 and 118, a power source (e.g., battery). The control module can also include, as shown in FIG. 1B, an electronic controller 195. The controller includes a processor 192, which is configured by executing instructions in the form of code that are stored on a computer readable non-transitory storage medium 194. The controller can electronically control operation of the vehicle by, inter alia, processing sensed data from sensors, processing stored instructions, and generating control instruction/signals for any number of different electronically controlled components that are commonly found on robotic vehicles such as motors, actuators and the like. In the exemplary configuration shown in FIGS. 1A-1B and 3A-3E, the drive wheels 117 and 118 are driven by motors 167 and 168 that are also supported by the hinge flaps 147 and 148, respectively.

Automatic Probe Normalization Mechanism

Provided within an interior of the chassis 112 between the left wheel 118 and right wheel 117 is a sensor mounting assembly or "probe carrier" for mounting the probe 130 to the first chassis section 112 of the vehicle 100. As shown in FIGS. 1A-1C and 4A-4E, the probe wheel 134 is configured to be exposed through an open bottom of the chassis 112.

Figure 2A:
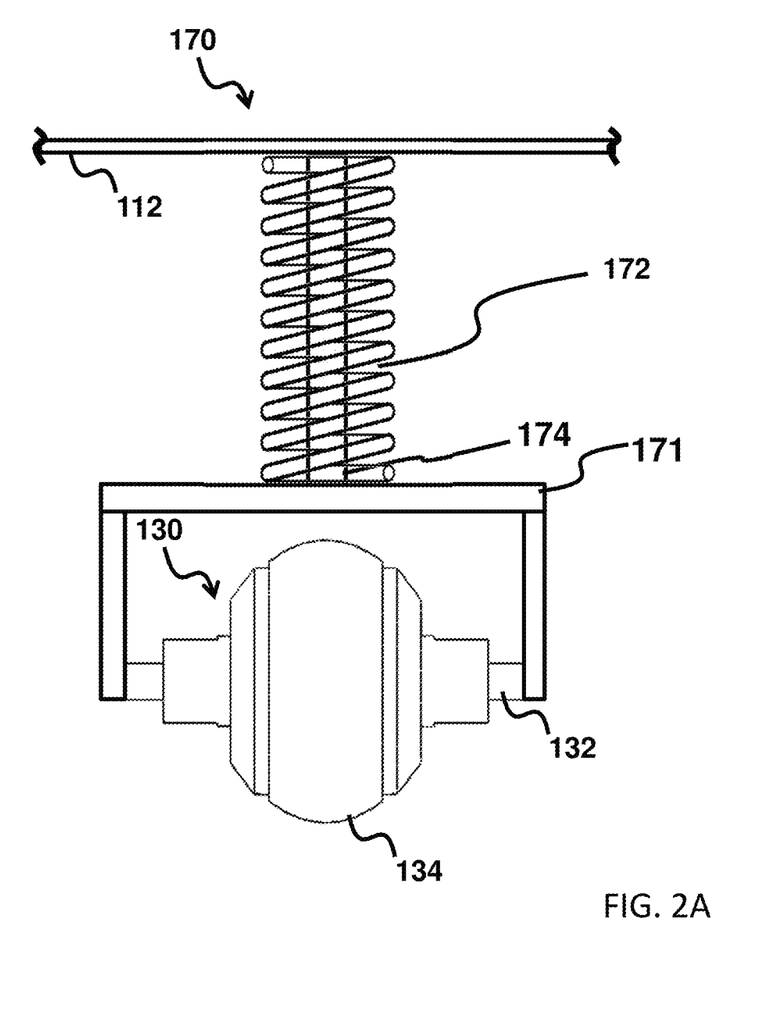
FIG. 2A is a simplified front view diagram of an exemplary sensor probe assembly of the two-wheel compact inspection crawler vehicle in accordance with one or more disclosed embodiments.
Figure 2B:
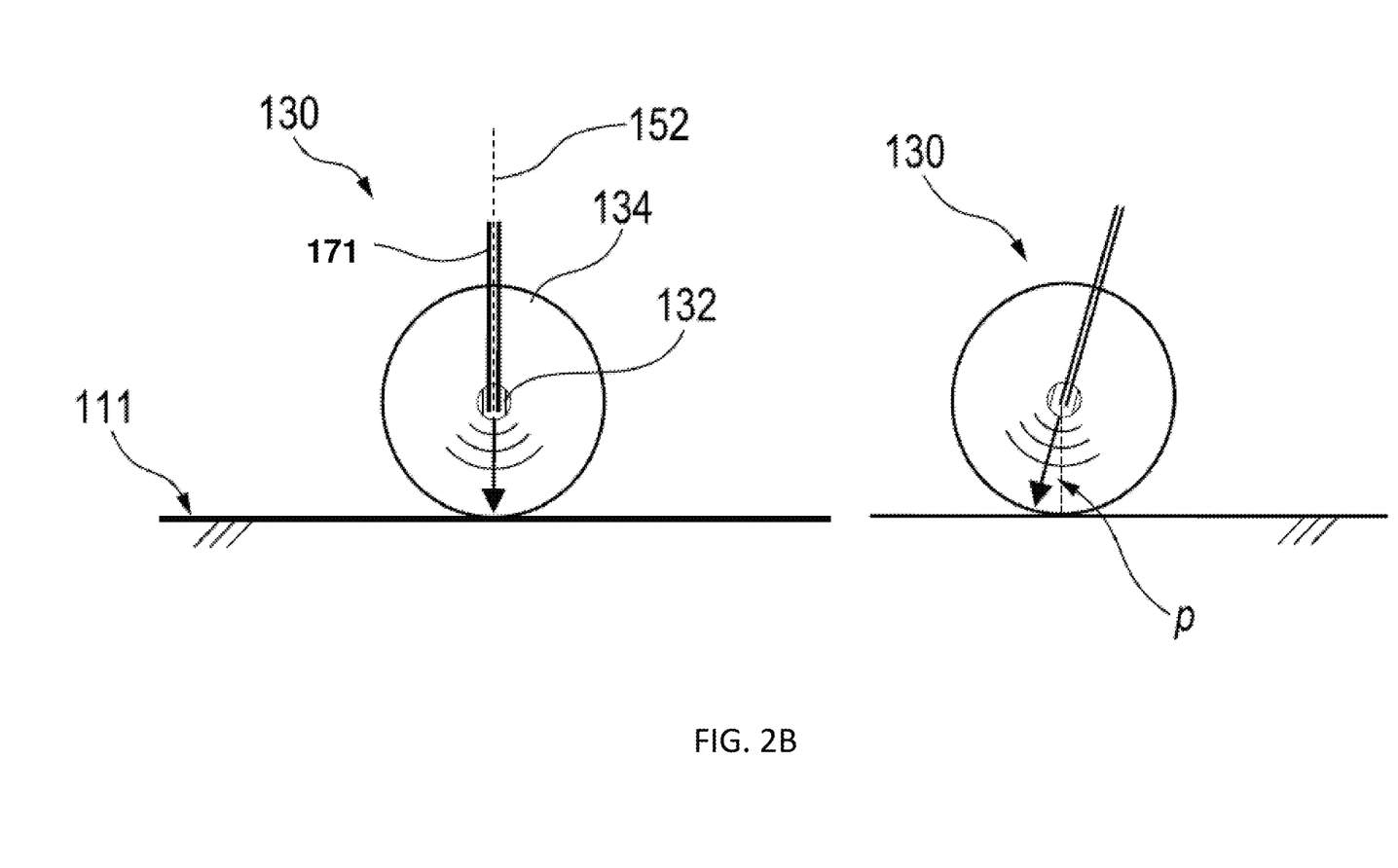
FIG. 2B is a simplified side view diagram of an exemplary sensor probe assembly of the two-wheel compact inspection crawler vehicle in accordance with one or more disclosed embodiments and showing a proper, normalized probe angle (left image) and improper normalization (right image)

Turning briefly to FIGS. 2A and 2B, which are a close-up simplified front-view and side-view of the probe 130, respectively. The probe 130 comprises a probe wheel 134, which rotates about a fixed probe transducer shaft 132. The probe transducer shaft is generally oriented along the axis of rotation of the outer probe wheel, which is also generally parallel to the lateral/horizontal axis 154 of the vehicle.

According to a salient aspect of one or more of the disclosed embodiments, the probe carrier 170 mounts the probe 130 to the chassis 112 and is configured to maintain the probe wheel 134 in contact with the surface during operation. In response to the surface curvature, the probe carrier passively moves the probe 130 in at least an up and down direction so as to compensate for different surface curvatures and the fact that the curved surface creeps (e.g., curves or crowns closer to the vehicle) in between the spaced apart drive wheels when driving helically or longitudinally on a pipe.

FIG. 2A is an isolated front view of the probe 130 and further illustrates an exemplary configuration of the probe carrier 170 mounting system. In this configuration, the probe carrier 170 comprises a fork-like structure 171 that the probe 130 is mounted to. More specifically, the shaft 132 of the probe wheel is supported at each end by the fork 171. Additionally, the fork is mounted to the chassis 112 by a telescoping shaft 174 that can be compressed or extended in length. The extension or compression of the shaft is spring-assisted by spring 172 to provide for self-adjustment of the probe wheel's position in the up/down direction relative to the surface 111.

The expansion force of spring 172, which is applied between the chassis and the probe and guided by the shaft 174, serves to adjust the height of the probe assembly 130 and thus maintain the probe wheel 134 in contact with the surface 111. The exemplary configurations of the probe 130 and probe carrier 170 are provided as a non-limiting example and alternative mounting systems can be used to support different types of inspection probes and provide movement of the probe in one or more degrees of freedom.

With regards to normalization of the probe's inspection angle, it should be noted that placing the wheel probe 134 in the middle of the crawler 100 (i.e., along the longitudinal axis 150) and in between the two drive wheels significantly simplifies issues related to alignment of the probe against the pipe. This placement of the probe basically reduces the normalization problem from a three Degree of Freedom challenge to a specific one DoF challenge where the only challenge to overcome would be the front/back inspection angle p of the probe transducer, which is addressed by the chassis stabilizing and probe normalization mechanism described herein. Furthermore, placement of the wheel probe in the center of the crawler can eliminate issues related to the probe wheel 134 dragging sideways as it can occur in other crawlers (unless the probe is lifted off the pipe before steering). Accordingly, the exemplary crawler vehicle disclosed herein are capable of continuously taking probe readings while carrying out maneuvers without needing to lift the probe off the pipe (i.e., by simply pivoting about the probe when steering).

For example, FIG. 2B is a simplified side view of certain components of the exemplary probe carrier 170 and probe 130 and illustrates the probe transducer shaft 132 properly normalized with the surface 111 (shown to the left) and with the probe angle p not properly normalized, e.g., not perpendicular to the surface (shown to the right). Thus, in accordance with the disclosed embodiments, the vehicle 100 includes a passive normalization mechanism 160 that provides passive normalization of the probe relative to the surface 111.

In the exemplary embodiment of the crawler 100, the normalization mechanism 160 can include a plurality of passively floating ball caster 162 arranged about the probe wheel 134 and exposed through the bottom side of the chassis 112.

Figure 4A:
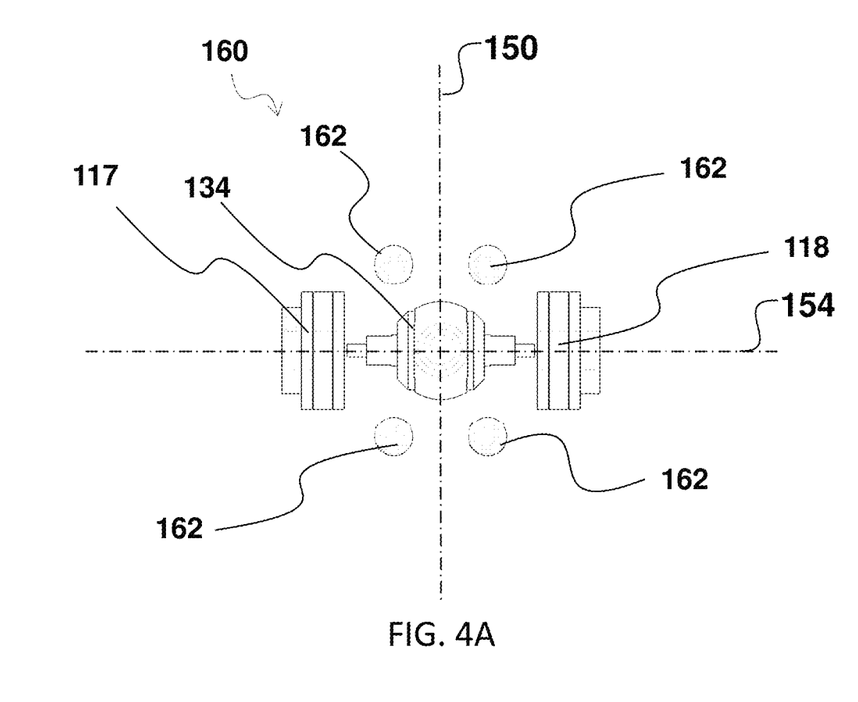
FIG. 4A is a simplified bottom-view diagram of components of a probe normalization mechanism of the two-wheel compact inspection crawler vehicle in accordance with one or more disclosed embodiments.
Figure 5:
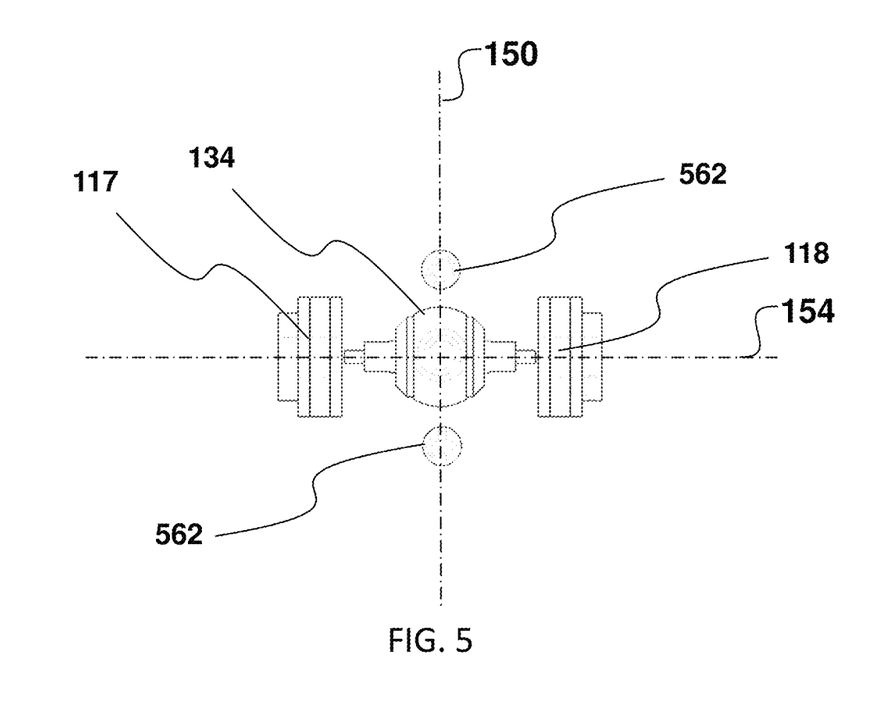
FIG. 5 is a simplified bottom-view diagram of components of a probe normalization mechanism in an alternative configuration in accordance with one or more disclosed embodiments.

FIG. 4A is a simplified bottom view showing the position of the ball casters 162 relative to the centrally located probe wheel 134. As shown, the ball casters 162 are arranged symmetrically across the longitudinal axis 150 and lateral axis 154 such that the probe wheel is centered between the casters and equidistant from the casters. In an alternative arrangement shown in FIG. 5, only two ball casters 562 are provided, one in front and one behind the probe wheel 134. Additionally the ball casters 562 are each provided along the longitudinal axis 150 and equidistant from the probe wheel. While the exemplary two caster configuration of FIG. 5 can provide suitable normalization of the probe angle in the longitudinal direction, the four-caster configuration is preferable because symmetry across both the lateral axis 154 and longitudinal axis 150 serves to normalize the probe angle in the longitudinal and lateral directions.

Figure 4B:
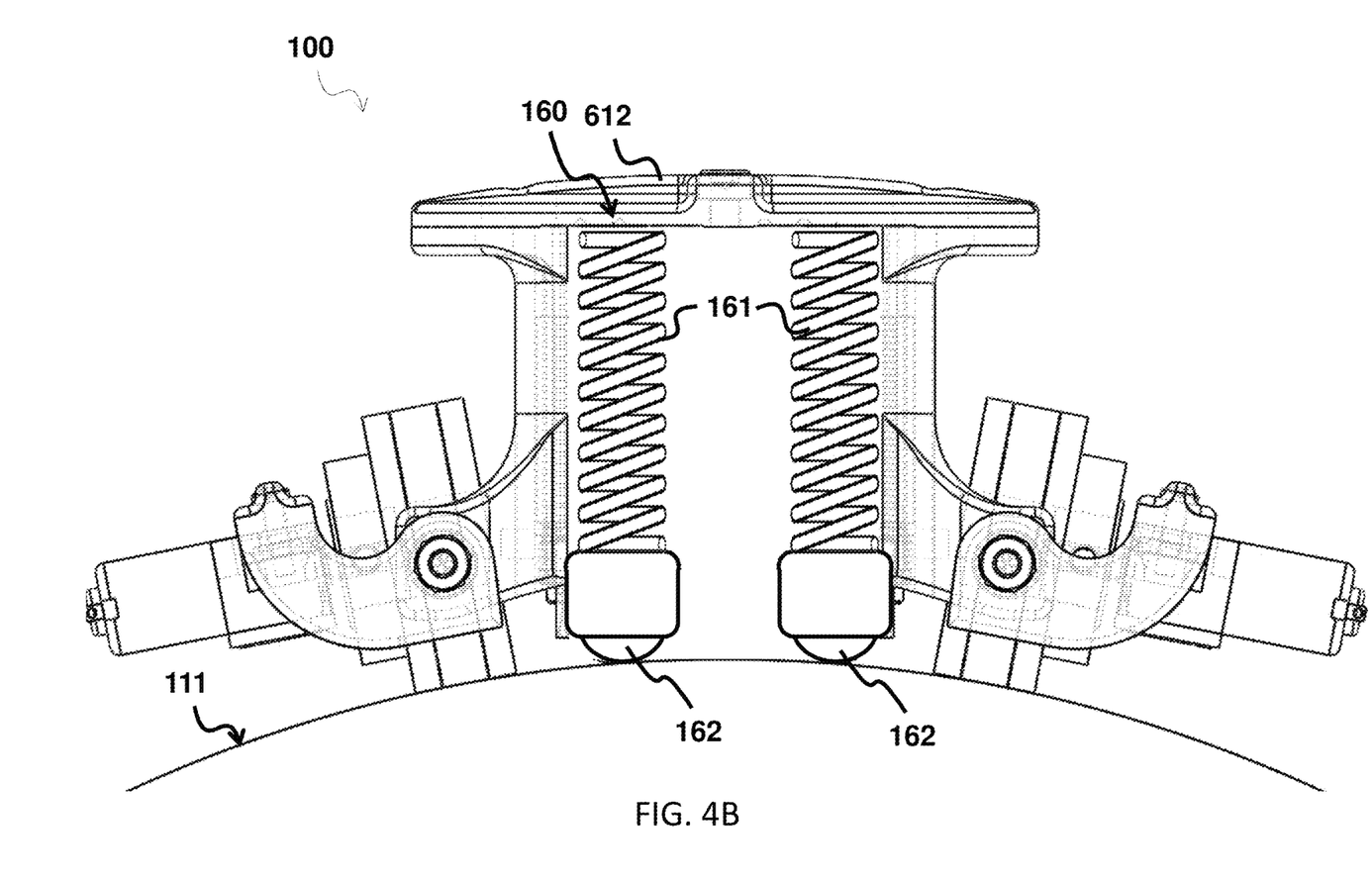
FIG. 4B is a front-view diagram of the two-wheel compact inspection crawler vehicle with the front side of the vehicle omitted to show the probe normalization mechanism in accordance with one or more disclosed embodiments.

The normalization mechanism 160 is shown in greater detail in FIG. 4B, which is a front view of the crawler 100 with part of the front wall of the chassis 112 removed to provide a more detailed view of two of the floating casters 162 comprising the probe normalization mechanism 160 housed inside the chassis. In FIG. 4B, the two back-side casters are not shown as they are obscured by the two front-side casters 162.

Each ball caster 162 is mounted to the chassis 112 using a linearly adjusting mounting mechanism ("caster carrier") that allows for passive adjustment of a respective ball caster in at least an up and down direction so as to compensate for different surface curvatures. For instance, the caster carrier can comprise a caster spring 161 compressed between the ball caster 162 and the top wall of the chassis 112. The caster spring is configured to exert an expansion force so as to urge the ball caster toward and into contact with the surface 111. Each ball caster can be mounted in a manner such that it is independently "floating," i.e., moveable in the up/down direction relative to the chassis 112. Although not shown, the movement of the caster in the up/down direction and spring can be guided by one or more shafts or other structures for housing the spring.

The sprung ball casters 162 serve the purpose of tilting the whole crawler chassis 112 and keeping the bottom side of the chassis 112 generally flat with respect to the surface 111 of the pipe so that the transducer of the probe 130 will always be pointing directly towards the surface 111 without the need for internal probe tilting mechanisms. More specifically, the ball casters 162 are configured to move in the up/down direction independent from each other but are "spring loaded" with springs 161 of identical specifications. As a result, the ball casters 162 will extend and contract with similar displacements and maintain the chassis 112 properly leveled (e.g., on a substantially parallel plane to the inspected surface) as long as similar forces are applied to them.

According to a salient aspect of the disclosure, in addition to the particular arrangement of the probe and casters relative to one another and the two curvature adjusting magnetic drive wheels, the combined utilization of the spring-biased and passively adjusting probe carrier on the one hand and the spring-biased and passively adjusting caster carriers on the other hand, which allow for vertical movement of the probe and the casters, serve to maintain the probe in contact with the surface, the chassis sufficiently level with the surface and thus the probe sufficiently normal to the surface to ensure valid UT measurements irrespective of changes in curvature with vehicle movement.

The independently moving ball caster configuration works well especially when traversing on the top or bottom of a horizontal pipe, and the crawler will maintain proper probe alignment regardless of pipe diameter. However, at some positions of the crawler 100 on a pipe uneven forces on the ball casters can cause uneven spring compression and thus some body tilt. For instance, when the crawler 100 is driving around a pipe circumferentially and reaches the side of the pipe, the weight of the crawler can lead to more compression in the lower ball casters and less compression in the upper ball casters, so the crawler body will tilt/rock slightly leading to some misalignment in the probe. Accordingly, the crawler is preferably relatively light weight and the caster springs 161 are specifically selected to be strong enough (i.e., have a suitable spring rate) such that any resulting crawler body tilt is small enough to be within a prescribed range of angles relative to the surface, wherein that prescribed range is within the probe's tolerated inspection angle misalignment margin (e.g., +/− two degrees from perpendicular to the surface).

Figure 6:
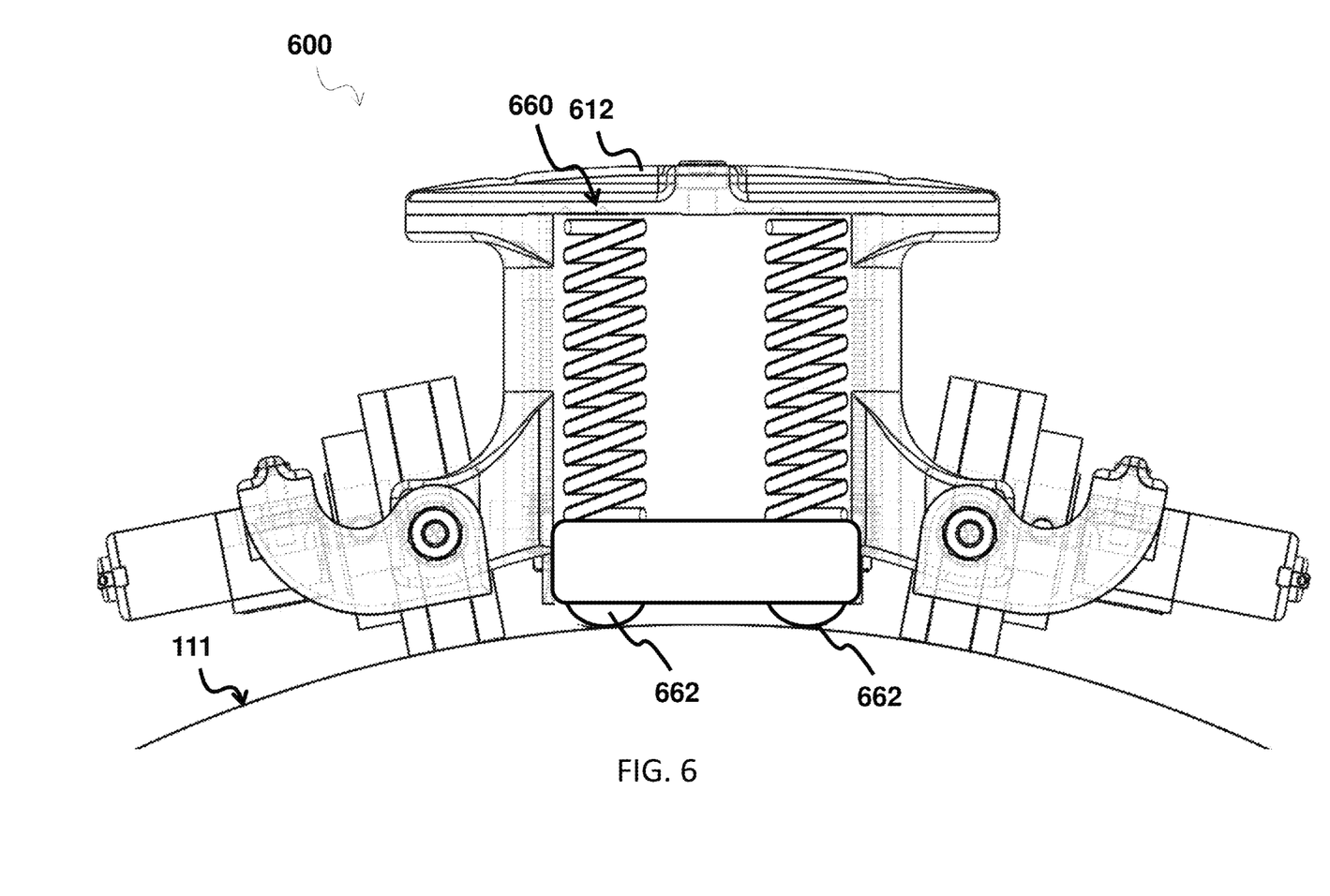
FIG. 6 is a front-view diagram of a two-wheel compact inspection crawler vehicle with the front side of the vehicle omitted in accordance with one or more disclosed embodiments.

In another embodiment, for instance as shown in FIG. 6, the normalization mechanism 660 of the crawler 600 can comprise ball casters 662 that are interconnected so that they move symmetrically with respect to each other and maintain crawler chassis 612 at a proper angle relative to the surface and thus maintain probe normalization regardless of pipe diameter or location on the pipe. In this example, all the ball casters 662 can be mounted to a single floating, spring-biased, structure so that they travel up or down together.

It should be understood that various combination, alternatives and modifications of the present invention could be devised by those skilled in the art. The present invention is intended to embrace all such alternatives, modifications and variances that fall within the scope of the appended claims.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A two-wheel compact inspection crawler vehicle for traversing surfaces including a curved surface, comprising:
   a chassis;
   two magnetic drive wheels,
      wherein each of the drive wheels is mounted to the chassis by a respective hinge joint configured to allow a respective drive wheel to move with respect to the chassis along a first path in at least a vertical direction in response to a curvature of the surface, and
      wherein the drive wheels are spaced apart in a lateral direction and are configured to be driven independently, and wherein a longitudinal axis of the chassis extends perpendicularly to the lateral direction and vertical direction and through a midpoint between the two drive wheels,
   a probe carrier mounted to be moveable relative to the chassis in at least the vertical direction in response to the curvature of the surface,
   a sensor probe provided at the midpoint between the two drive wheels and generally in line with the two drive wheels in the lateral direction, wherein the sensor probe is mounted to the probe carrier such that it is moveable relative to the chassis in at least the vertical direction in response to the curvature of the surface;
   a plurality of caster carriers, each caster carrier being mounted to be moveable relative to the chassis in at least the vertical direction; and
   a plurality of ball casters configured to contact and move along the surface during operation of the vehicle, wherein the ball casters are arranged about the sensor probe such that the probe is centrally positioned between the plurality of ball casters, and wherein each ball caster is mounted to a respective caster carrier among the plurality of caster carriers such that the ball casters are moveable relative to the chassis in at least the vertical direction in response to the curvature of the surface,
   wherein each caster carrier mechanically couples a respective ball caster to the chassis and comprises a respective spring element configured to exert an expansion force between the respective ball caster and the chassis that urges the respective ball caster downward through a bottom opening in the chassis and into contact with the surface, whereby the caster carriers maintain the ball casters in contact with the surface and the chassis substantially level and the sensor probe at a prescribed angle to the surface.

2. The two-wheel compact inspection crawler vehicle of claim 1, comprising: four ball casters, wherein two of the ball casters are positioned forward of the sensor probe and two ball casters are positioned rearward of the sensor probe.

3. The two-wheel compact inspection crawler vehicle of claim 2, wherein two of the ball casters are positioned relative to two other ball casters symmetrically with respect to the longitudinal axis, and wherein two of the ball casters are positioned relative to two other ball casters symmetrically with respect to a lateral axis.

4. The two-wheel compact inspection crawler vehicle of claim 1, wherein the sensor probe is provided along the longitudinal axis and a lateral axis of the vehicle, and further comprising:
   a first ball caster positioned forward of the sensor probe, and a second ball caster positioned rearward of the sensor probe, wherein the first and second ball casters are equidistant from the lateral axis, and wherein the first and second ball casters are positioned in line with the longitudinal axis.

5. The two-wheel compact inspection crawler vehicle of claim 1, wherein the respective spring elements of the caster carriers have an identical spring rate.

6. The two-wheel compact inspection crawler vehicle of claim 1, wherein the sensor probe comprises a dry coupled wheel probe having a probe wheel rotating about a fixed probe transducer shaft and a probe transducer within the probe transducer shaft, wherein the probe wheel is configured to passively roll generally in a direction of travel of the vehicle along the surface.

7. The two-wheel compact inspection crawler vehicle of claim 1, wherein the probe carrier comprises at least one shaft for supporting the sensor probe, the at least one shaft being coupled to the chassis by a mount configured to allow the at least one shaft to move relative to the chassis in at least the vertical direction; and
- a spring element configured exert a force between at least the probe carrier and the chassis, and wherein the force urges the sensor probe downward through an open bottom end of the chassis and into contact with the surface.

8. The two-wheel compact inspection crawler vehicle of claim 1, wherein the drive wheels are each mounted to a respective flap and wherein the respective flap is connected to the chassis by the respective hinge joints, wherein each respective hinge joint hinges about a respective hinge axis that is oriented generally parallel to the longitudinal axis and wherein movement of the respective drive wheel along the first path comprises tilting a vertical axis of the respective drive wheel toward or away from the chassis.

9. The two-wheel compact inspection crawler vehicle of claim 1, wherein the plurality of ball casters are joined together in a fixed relationship.

10. A two-wheel compact inspection crawler vehicle for traversing surfaces including a curved surface, comprising:
- a chassis;
- two magnetic drive wheels,
  - wherein each of the drive wheels is mounted to the chassis by a respective hinge joint configured to allow a respective drive wheel to move with respect to the chassis along a first path in at least a vertical direction in response to a curvature of the surface, and
  - wherein the drive wheels are spaced apart in a lateral direction and are configured to be driven independently, and wherein a longitudinal axis of the chassis extends perpendicularly to the lateral direction and vertical direction and through a midpoint between the two drive wheels,
- a probe carrier mounted to be moveable relative to the chassis in at least the vertical direction in response to the curvature of the surface,
- a sensor probe provided at the midpoint between the two drive wheels and generally in line with the two drive wheels in the lateral direction, wherein the sensor probe is mounted to the probe carrier such that it is moveable relative to the chassis in at least the vertical direction in response to the curvature of the surface; and
- a plurality of caster carriers, each caster carrier being mounted to be moveable relative to the chassis in at least the vertical direction,
- a plurality of ball casters configured to contact and move along the surface during operation of the vehicle, wherein at least two ball casters among the plurality of ball casters are spaced apart in the lateral direction and wherein at least two of the ball casters among the plurality of ball casters are spaced apart in a longitudinal direction and wherein the ball casters are arranged about the sensor probe such that the probe is centrally positioned between the plurality of ball casters, and wherein each ball caster is mounted to a respective caster carrier among the plurality of caster carriers such that the ball casters are moveable relative to the chassis in at least the vertical direction in response to the curvature of the surface,
- wherein the sensor probe comprises a dry coupled wheel probe having a probe wheel rotating about a fixed probe transducer shaft and a probe transducer within the probe transducer shaft, wherein the probe wheel is configured to passively roll generally in a direction of travel of the vehicle along the surface,
- wherein the probe carrier is configured to maintain the probe transducer at a fixed angle relative to the chassis, the probe carrier further comprising a spring element configured exert a force against the chassis that urges the probe wheel downward through an open bottom end of the chassis and into contact with the surface, and wherein the probe carrier is configured to passively move the probe wheel up or down in the vertical direction in response to the curvature of the surface thereby maintaining the probe wheel in contact with the surface irrespective of changes in the curvature with vehicle movement;
- the respective caster carrier comprising a spring element configured exert a force against the chassis that urges the respective ball caster downward through an open bottom end of the chassis and into contact with the surface, and wherein the caster carriers are configured to passively move the respective ball casters up or down in the vertical direction in response to the curvature of the surface thereby maintaining the ball casters in contact with the surface, the chassis generally level with the surface and the probe transducer within a prescribed range of angles relative to the surface, irrespective of changes in the curvature with vehicle movement.

* * * * *